United States Patent
Tsirkin

(10) Patent No.: US 9,553,764 B2
(45) Date of Patent: Jan. 24, 2017

(54) MIGRATION OF GUEST BRIDGE

(71) Applicant: Red Hat Israel, Ltd., Ra'anana (IL)

(72) Inventor: Michael Tsirkin, Ra'anana (IL)

(73) Assignee: Red Hat Israel, Ltd., Ra'anana (IL)

(*) Notice: Subject to any disclaimer, the term of this patent is extended or adjusted under 35 U.S.C. 154(b) by 377 days.

(21) Appl. No.: 13/944,443

(22) Filed: Jul. 17, 2013

(65) Prior Publication Data

US 2015/0023358 A1    Jan. 22, 2015

(51) Int. Cl.
| | |
|---|---|
| H04L 12/24 | (2006.01) |
| H04L 12/54 | (2013.01) |
| H04L 12/751 | (2013.01) |
| H04L 12/755 | (2013.01) |
| H04L 12/707 | (2013.01) |
| H04L 12/753 | (2013.01) |

(52) U.S. Cl.
CPC ........... *H04L 41/0816* (2013.01); *H04L 12/56* (2013.01); *H04L 41/0813* (2013.01); *H04L 45/021* (2013.01); *H04L 45/026* (2013.01); *H04L 12/24* (2013.01); *H04L 41/00* (2013.01); *H04L 45/22* (2013.01); *H04L 45/48* (2013.01)

(58) Field of Classification Search
CPC ........ H04L 45/66; H04L 49/70; H04L 49/351; H04L 49/357; H04L 49/602
USPC .................................. 370/401; 709/224, 242
See application file for complete search history.

(56) References Cited

U.S. PATENT DOCUMENTS

| | | | |
|---|---|---|---|
| 8,175,103 B2 | 5/2012 | Germain et al. | |
| 8,223,770 B2 | 7/2012 | Wray et al. | |
| 8,255,496 B2 | 8/2012 | Shukla et al. | |
| 8,312,318 B2 | 11/2012 | Graham et al. | |
| 2008/0186990 A1* | 8/2008 | Abali ................. | G06F 9/45558 370/419 |
| 2009/0199177 A1 | 8/2009 | Edwards et al. | |
| 2009/0296726 A1 | 12/2009 | Snively et al. | |
| 2010/0118868 A1* | 5/2010 | Dabagh ............... | H04L 49/9042 370/389 |

(Continued)

FOREIGN PATENT DOCUMENTS

KR        20010038541 A        5/2001

OTHER PUBLICATIONS

Qin Li et al. "HyperMIP: Hypervisor Controlled Mobile IP for Virtual Machine Live Migration Across Networks." High Assurance Systems Engineering Symposium, Dec. 3-5, 2008. HASE 2008. 11th IEEE. pp. 80-88.

(Continued)

*Primary Examiner* — Jae Y Lee
*Assistant Examiner* — Jean F Voltaire
(74) *Attorney, Agent, or Firm* — Haynes and Boone, LLP

(57) ABSTRACT

A system and method for migrating a guest bridge are provided. An example method includes maintaining at a guest bridge a set of forwarding tables including a set of mappings from a network address to at least one virtual network interface of a set of virtual network interfaces. The method includes receiving at the guest bridge a notification that the guest bridge has migrated to a target host machine. The target host machine includes a set of physical network interfaces, and each physical network interface of the set of physical network interfaces is coupled to a network. The method further includes responsive to the notification, updating the set of forwarding tables.

20 Claims, 6 Drawing Sheets

(56) References Cited

U.S. PATENT DOCUMENTS

2011/0087774 A1* 4/2011 Pope .................. G06F 9/4856
  709/224
2012/0110181 A1 5/2012 Tsirkin et al.

OTHER PUBLICATIONS

Yi Wang et al. "Virtual Routers on the Move: Live Router Migration as a Network-Management Primitive." SIGCOMM '08 Proceedings of the ACM SIGCOMM 2008 Conference on Data Communication. Oct. 2008. pp. 231-242.

* cited by examiner

MIGRATION OF GUEST BRIDGE

FIELD OF DISCLOSURE

The present disclosure generally relates to a computing system, and more particularly to a networked computing system.

BACKGROUND

A network bridge may be used in computer networks to interconnect two local area networks together and separate network segments. A segment may be a section of a network that is separated by bridges, switches, and/or routers. The bridge, also known as a layer 2 switch, is typically a hardware device used to create a connection between two separate computer networks or to divide one network into two networks.

The bridge is a layer 2 device in the Open System Interconnection (OSI) model, meaning that it uses the media access control (MAC) address information to make decisions regarding forwarding packets. The OSI model is a model of communication upon which hardware and software may be developed and connected.

BRIEF SUMMARY

This disclosure relates to networked computing systems. Methods, systems, and techniques for updating one or more forwarding tables maintained by a guest bridge are disclosed.

According to an embodiment, a system for migrating a guest bridge includes a target host machine including a set of physical network interfaces. Each physical network interface of the set of physical network interfaces is coupled to a network. The system also includes a guest bridge executable on the target host machine. The guest bridge receives a set of incoming packets and includes a set of virtual network interfaces. Each virtual network interface is coupled to a network via a physical network interface of the set of physical network interfaces. The guest bridge maintains a set of forwarding tables including a set of mappings from a network address to at least one virtual network interface of the set of virtual network interfaces, and forwards based on the set of forwarding tables the set of incoming packets to at least one virtual network interface of the set of virtual network interfaces. The guest bridge receives a notification that the guest bridge has migrated to the target host machine and updates the set of forwarding tables based on the notification.

According to another embodiment, a method of migrating a guest bridge includes maintaining at a guest bridge a set of forwarding tables including a set of mappings from a network address to at least one virtual network interface of a set of virtual network interfaces of the guest bridge. The method also includes receiving at the guest bridge a notification that the guest bridge has migrated to a target host machine. The target host machine includes a set of physical network interfaces. Each physical network interface of the set of physical network interfaces is coupled to a network. The method also includes responsive to the notification, updating the set of forwarding tables.

According to another embodiment, a non-transitory machine-readable medium is provided. The non-transitory machine-readable medium includes a plurality of machine-readable instructions that when executed by one or more processors is adapted to cause the one or more processors to perform a method including: maintaining at a guest bridge a set of forwarding tables including a set of mappings from a network address to at least one virtual network interface of a set of virtual network interfaces; receiving at the guest bridge a notification that the guest bridge has migrated to a target host machine, the target host machine including a set of physical network interfaces, and each physical network interface of the set of physical network interfaces being coupled to a network; and responsive to the notification, updating the set of forwarding tables.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architectures
   A. Bridge Networks
   B. Forwarding Tables
   C. Guest Bridge Migration
III. Update Forwarding Tables
   A. Check for Interface Crossing
   B. Delete Forwarding Table(s)
   C. Deactivate Forwarding Table(s)
   D. Remap Entries in Forwarding Table(s)
IV. Example Method
V. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

This disclosure provides techniques to migrate a guest bridge. In an embodiment, a target host machine and a guest bridge executable on the target host machine are provided. The target host machine includes a set of physical network interfaces. Each physical network interface of the set of physical network interfaces is coupled to a different network. The guest bridge receives a set of incoming packets and includes a set of virtual network interfaces. Each virtual network interface is coupled to a network via a physical network interface of the set of physical network interfaces. The guest bridge maintains a set of forwarding tables including a set of mappings from a network address to at least one virtual network interface of the set of virtual network interfaces, and forwards based on the set of forwarding tables the set of incoming packets to at least one virtual network interface of the set of virtual network interfaces. The guest bridge receives a notification that the guest bridge has migrated to the target host machine and updates the set of forwarding tables based on the notification.

II. Example System Architectures

Figure 1:
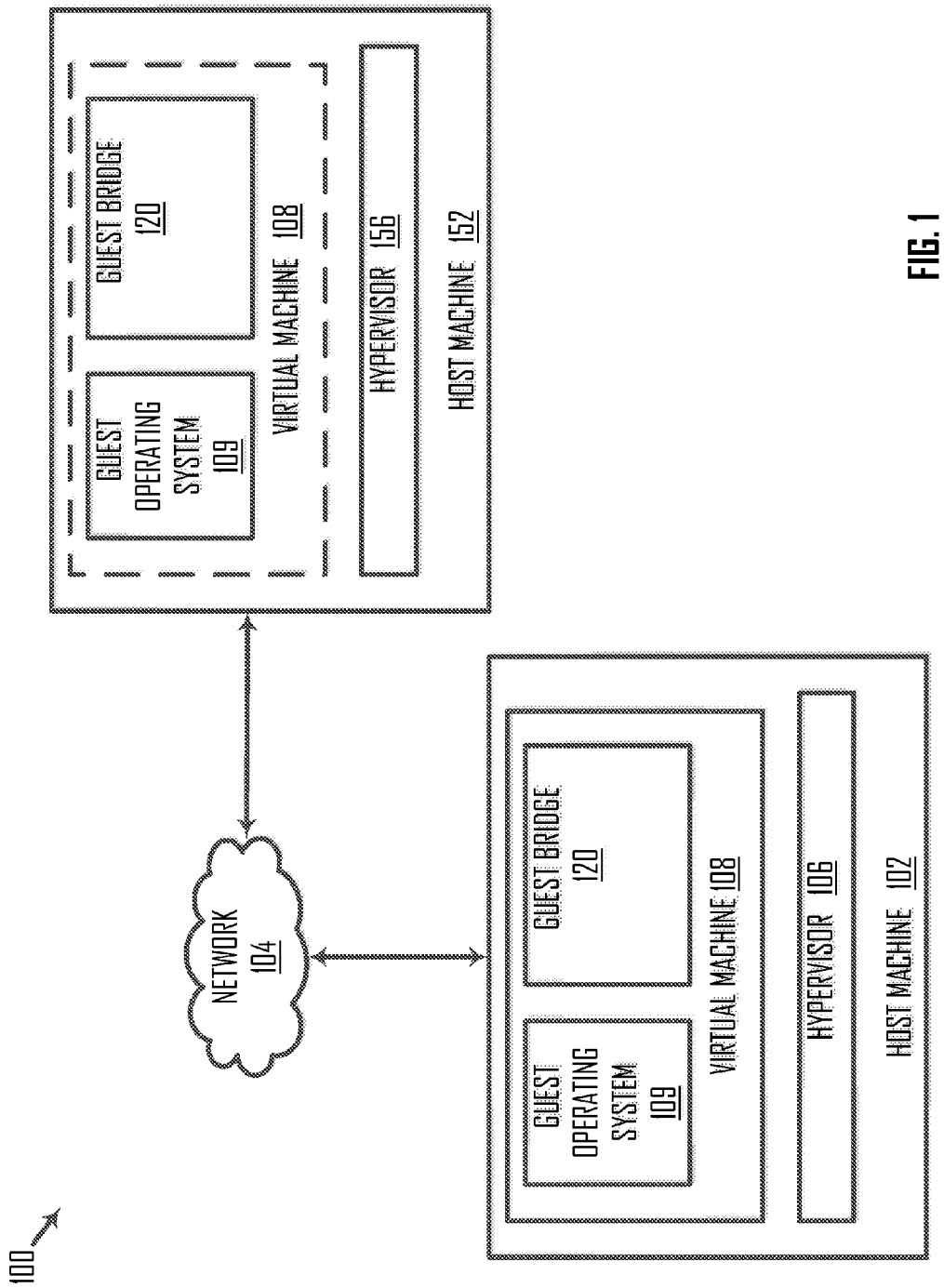
FIG. 1 is a block diagram illustrating a system after migration of a guest bridge to a target host machine, according to an embodiment.

FIG. 1 is a block diagram 100 illustrating a system after migration of a guest bridge to a target host machine, according to an embodiment. Diagram 100 includes host machine 102 and host machine 152 coupled to a network 104. Each of host machine 102 and host machine 152 may communicate with each other via network 104.

Network 104 may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Host machine 102 includes a hypervisor 106 and a virtual machine 108. Virtual machine 108 includes a guest operating system (OS) 109 and a guest bridge 120. In an embodiment, network 104 includes multiple smaller networks (e.g., local area networks) and guest bridge 120 bridges networks by passing packets from one network to another network. In an example, guest bridge 120 is implemented in software that is executed in virtual machine 108 to forward packets from one network to another network.

A host machine may run one or more virtual machines that run applications and services. The hypervisor may provide the virtual machine with access to resources on the host machine. The virtual machine runs a guest OS that may be different from another guest OS system running in another virtual machine that is running on the host machine and may also be different from the host OS running on the host machine. The host or guest OS may include, for example, MICROSOFT® WINDOWS®, LINUX®, SOLARIS®, and MAC® OS. Trademarks are the property of their respective owners.

A virtual machine running on a host machine may be migrated to another host machine. In an example, guest bridge 120 may execute in virtual machine 108 and may be migrated to another host machine. Guest bridge 120 may execute in a virtual machine for a variety of reasons. For example, guest bridge 120 may provide security when bridging physical network interfaces that are coupled to a network.

Virtual machine 108 may migrate from host machine 102 to host machine 152. Virtual machine 108 in host machine 152 is illustrated using dashed lines to indicate that virtual machine 108 has migrated from host machine 102 to host machine 152. The host machine from which guest bridge 120 migrated may be referred to as the source host machine (e.g., host machine 102), and the host machine to which guest bridge 120 migrates may be referred to as the target host machine (e.g., host machine 152). Host machine 152 includes a hypervisor 156. Hypervisor 156 may send a notification to guest bridge 120 that it has migrated to host machine 152.

Figure 2:
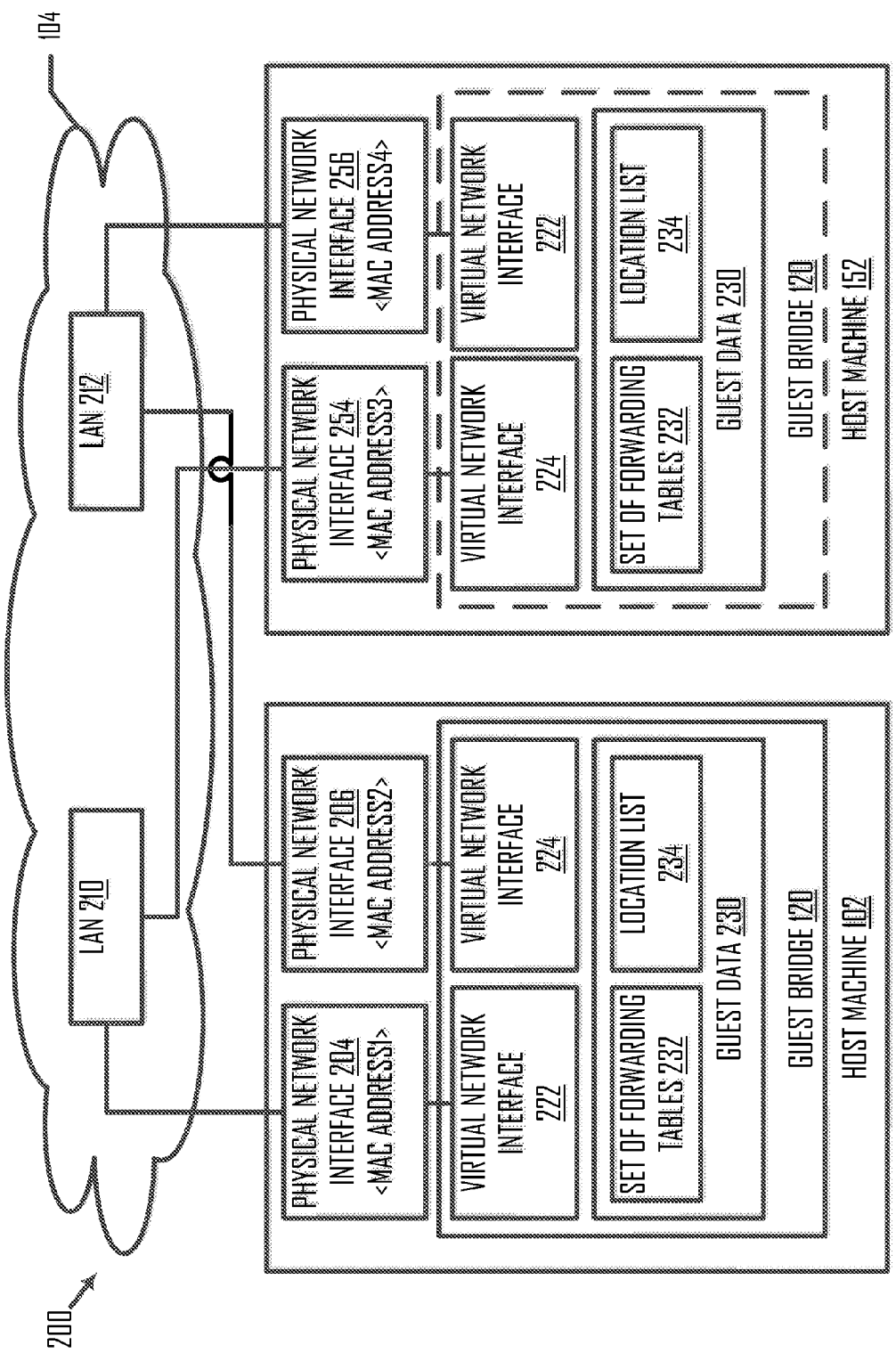
FIG. 2 is a block diagram illustrating a system after migration of the guest bridge to a target host machine, according to an embodiment.

FIG. 2 is a block diagram 200 illustrating a system after migration of the guest bridge to a target host machine, according to an embodiment.

Diagram 200 includes host machine 102 and host machine 152 coupled over network 104. A host machine may include a set of physical network interfaces. Host machine 102 includes physical network interfaces 204 and 206 that may be used to send or receive data over a network. Host machine 152 includes physical network interfaces 254 and 256 that may be used to send or receive data over a network. A physical network interface enables a node to receive and transmit data over network media. The physical network interface may include a transceiver that transmits and receives data signals to a wire or into the air and assemble or disassemble packets. A physical network interface may be, for example, a physical network interface card.

A. Bridge Networks

Diagram 200 also includes a guest bridge 120 that is capable of being executed on a host machine (e.g., host machine 102 and host machine 152). Guest bridge 120 may create a connection between two separate computer networks or divide one network into two networks. For example, guest bridge 120 may connect nodes within a common network and allow the division of a large network into two or more smaller and efficient networks. Network 104 may include local area networks 110 and 112. Guest bridge 120 bridges local area networks 210 and 212 and may forward packets from one local area network to another local area network. A packet may refer to a discrete chunk of data that is routed over a network.

Local area networks 210 and 212 may have the same or different network topologies. For example, local area networks 210 and 212 may be Ethernet networks. In another example, local area network 210 may be an Ethernet network and local area network 212 may be a token ring network. Additionally, both networks may use the same protocol or different protocols. Further, local area network 210 may be a secure local area network, and local area network 212 may be an insecure local area network.

Guest bridge 120 may bridge local area networks 210 and 212 via physical network interfaces 204 and 206, respectively. The following is a description of host machine 102. This description may apply as well to host machine 152. Each physical network interface of host machine 102 may be coupled to a different network. For example, physical network interface 204 is coupled to local area network 210, and physical network interface 206 is coupled to local area network 212. As such, physical network interfaces 204 and 206 may receive packets from and send packets to nodes coupled to local area networks 210 and 212 using guest bridge 120.

Guest bridge 120 may be a virtual configuration, and computing devices that are coupled to local area network 110 or local area network 112 may communicate via a physical network interface of the respective computing device and a virtual network interface of guest bridge 120. Guest bridge 120 may include a set of virtual network interfaces. A physical network interface may have one or more virtual network interfaces logically connected to the physical network interface. A virtual network interface may act as a physical network interface for a virtual machine.

Guest bridge 120 includes virtual network interfaces 222 and 224 that are each coupled to a network via a physical network interface. For example, virtual network interface 222 is coupled to local area network 210 via physical network interface 204, and virtual network interface 224 is coupled to local area network 212 via physical network interface 206.

Guest bridge 120 may monitor traffic on both sides of the network so that packets of information may be passed to the correct location. Each network interface may be assigned a network address that helps in sending information to the intended destination. In an example, each network interface coupled to a network is assigned a unique address called a media access control (MAC) address. A MAC address may be, for example, assigned to a network interface by the manufacturer of the network interface or assigned to the network interface by the network in which it is connected. Although the present disclosure describes the network address as being a MAC address, this is not intended to be limiting and other identifiers may be used to identify a node coupled to the network.

In FIG. 2, physical network interface 204 of host machine 102 is assigned Mac Address 1, and physical network interface 206 of host machine 102 is assigned Mac Address 2. Physical network interface 254 of host machine 152 is assigned Mac Address 3, and physical network interface 256 of host machine 152 is assigned Mac Address 4.

In an embodiment, guest bridge 120 operates at the data link layer and uses MAC addresses for transmitting packets. A packet may include, among other data, a destination IP address, source IP address, destination MAC address, and source MAC address. The packet may be generated at the data link layer. The data link layer may be responsible for reliable delivery of data from node to node and for providing services to the network layer. At the sender node, packets may be transmitted to the receiver. At the receiver's end, the data link layer may detect and correct any errors in the transmitted data that the receiver obtains from the physical layer. Other functions of the data link layer may include error control and flow control. Error control may ensure that all packets have been delivered to the destination network layer and in the proper order. Flow control may manage the sender node to send packets according to the receiving capability of the recipient.

In an embodiment, guest bridge 120 uses MAC addresses to forward packets and interconnects local area networks 210 and 212. The MAC address may be the lowest-level address that is included in a packet at the data link layer to identify the destination node. The size and format of the MAC address may depend on the underlying physical network. That is, different networks may have different address formats. In an example, devices in local area network 210 have MAC addresses starting with a first pattern, and devices in local area network 212 have MAC addresses starting with a second pattern different from the first pattern.

B. Forwarding Tables

Guest bridge 120 includes guest data 230 including a set of forwarding tables 232 and a location list 234. Location list 234 may keep track of one or more locations in which guest bridge 120 has executed. More details about location list 234 will be discussed further below. Set of forwarding tables 232 includes one or more forwarding tables that include a set of mappings from a network address to at least one virtual network interface of guest bridge 120. In an embodiment, each forwarding table of set of forwarding tables 232 corresponds to a virtual network interface of guest bridge 120. Guest bridge 120 may receive one or more incoming packets and forward based on set of forwarding tables 232 the one or more incoming packets to at least one virtual network interface of guest bridge 120. In this way, guest bridge 120 may help to forward packets from one node to another node.

Guest bridge 120 may maintain set of forwarding tables 232. In an example, guest bridge 120 stores set of forwarding tables 232 in an internal memory within the bridge. In an embodiment, guest bridge 120 monitors packets on a network and associates particular MAC addresses with a virtual network interface of guest bridge 120. Guest bridge 120 may insert entries into set of forwarding tables 232 based on the association.

Figure 3:
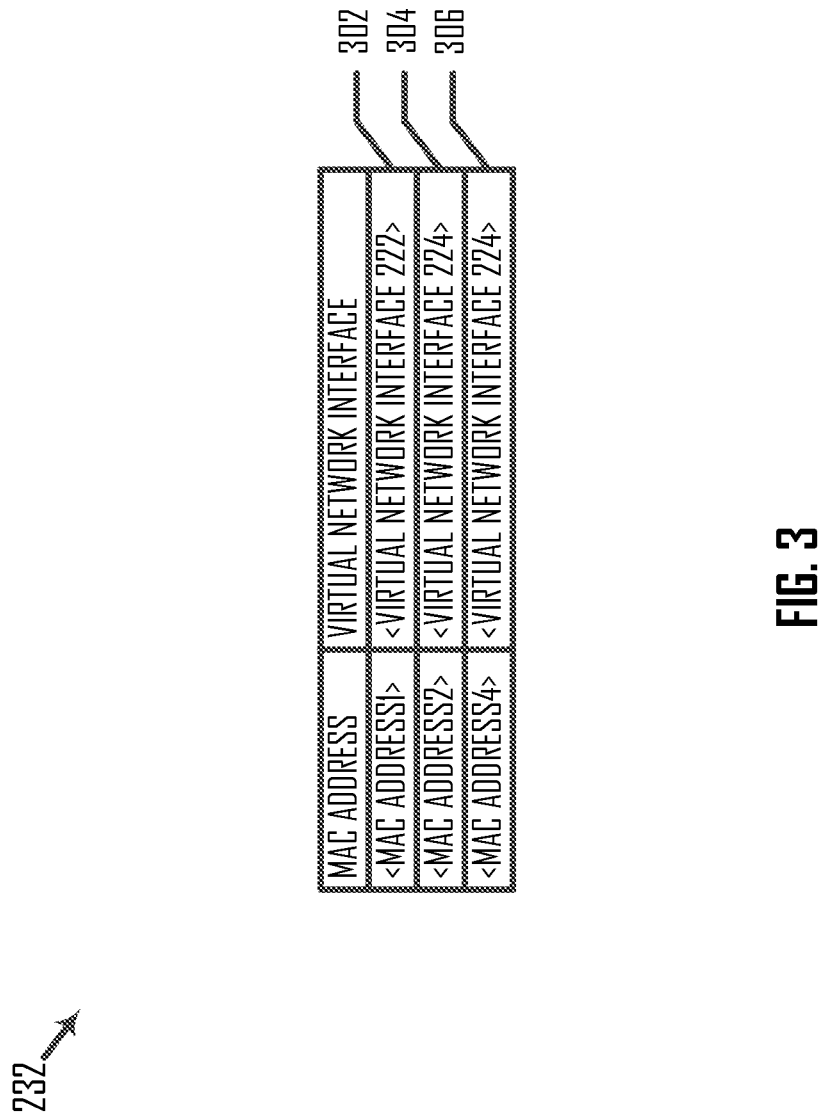
FIG. 3 is a block diagram illustrating a forwarding table maintained by the guest bridge, according to an embodiment.

FIG. 3 is a block diagram illustrating a forwarding table maintained by the guest bridge, according to an embodiment. Guest bridge 120 may receive packets from a physical network interface or a virtual network interface and dynamically build set of forwarding tables 232 based on the traffic. In this way, guest bridge 120 may learn the source address and interface associations.

In an example, physical network interface 204 may send a packet including a source MAC address of Mac address 1, and guest bridge 120 may receive the packet at virtual network interface 222. Guest bridge 120 may insert an entry 302 that associates Mac Address 1 with virtual network interface 222 into set of forwarding tables 232. Entries 304 and 306 may be inserted into set of forwarding tables 232 using similar logic.

When guest bridge 120 subsequently receives a packet including a destination address in its forwarding table, guest bridge 120 forwards the packet out of the interface stored in the forwarding table. In an example, guest bridge 120 may receive a packet including a destination MAC address of MAC address 1, search set of forwarding tables 232 for MAC address 1, and forward the packet to virtual network interface 222 based on entry 302. If set of forwarding tables 232 does not include the destination MAC address (e.g., guest bridge 120 has not yet seen the destination address), guest bridge 120 may treat the packet as if it were a broadcast and flood the packet out to all active interfaces except for the interface on which it was received. Flooding may be advantageously used if guest bridge 120 has insufficient memory to store set of forwarding tables 232 for all of the interfaces of guest bridge 120. As the packets are forwarded, the learning process of guest bridge 120 continues. A packet may traverse multiple bridges before arriving at the final destination with a MAC address that matches the destination MAC address of the packet.

C. Guest Bridge Migration

When guest bridge 120 migrates to a different location within the same local area networks to which guest bridge 120 is coupled, the data in set of forwarding tables 232 may be inaccurate because one or more virtual network interfaces of guest bridge 120 may get "crossed" and coupled to a different network. For example, in FIG. 2, when guest bridge 120 is located at host machine 102, virtual network interface 222 is coupled to local area network 210 via physical network interface 204 and virtual network interface 224 is coupled to local area network 212 via physical network interface 206. When guest bridge 120 migrates from host machine 102 to host machine 152, however, virtual network interface 222 becomes coupled to local area network 212 (rather than network 210) via physical network interface 256 of host machine 152 and virtual network interface 224 becomes coupled to local area network 210 (rather than network 212) via physical network interface 254 of host machine 152. Accordingly, when guest bridge 120 migrates in FIG. 2, set of forwarding tables 232 (e.g., entries 302, 304, and 306) become inaccurate because the packets should be forwarded to a different interface than that specified in set of forwarding tables 232.

Guest bridge 120 may wait for set of forwarding tables 232 to time out. For example, guest bridge 120 may wait for the old entries that were inserted at the source host machine to be aged and removed so that the set of forwarding tables reflect the current location of guest bridge 120 and the correct packet forwarding information.

It may be desirable for guest bridge 120 to update set of forwarding tables 232 after the migration to match guest bridge 120's new location without waiting for the entries to time out. For example, guest bridge 120 may update set of forwarding tables 232 immediately after migration to match the new location of guest bridge 120.

When guest bridge 120 migrates to host machine 152, guest bridge 120 may receive a notification that the guest bridge has migrated to the target host machine. The notification may include a current location of guest bridge 120. Referring back to FIG. 1, when guest bridge 120 migrates from host machine 102 to host machine 152, hypervisor 156 of host machine 152 may notify guest bridge 120 that it has migrated to host machine 152 and send guest bridge 120 details of its location.

Each virtual network interface of guest bridge 120 may be associated with a location. In an example, the location information may be the name of the network to which the respective virtual network interface of guest bridge 120 is coupled. For each virtual network interface of guest bridge 120, a current location of the respective virtual network interface may be an identifier of a network that is coupled to the respective virtual network interface of the guest bridge at the target host machine, and a previous location of the respective virtual network interface may be an identifier of a network that is coupled to the respective virtual network interface of the guest bridge at the source host machine.

Now referring to FIGS. 1 and 2, when guest bridge 120 is located at host machine 102, guest bridge 120 may receive location information from hypervisor 106 specifying that a location of virtual network interface 222 is the name of local area network 210 and a location of virtual network interface 224 is the name of local area network 212. In contrast, when guest bridge 120 is located at host machine 152, guest bridge 120 may receive location information from hypervisor 156 specifying that a location of virtual network interface 222 is the name of local area network 212 and a location of virtual network interface 224 is the name of local area network 210.

In another example, the location information may be a network address (e.g., MAC address) of the physical network interface to which a virtual network interface of guest bridge 120 is coupled. For each virtual network interface of guest bridge 120, a current location of the respective virtual network interface may be the MAC address of the physical network interface that is coupled to the respective virtual network interface of the guest bridge at the target host machine, and a previous location of the respective virtual network interface may be the MAC address of the physical network interface that is coupled to the respective virtual network interface of the guest bridge at the source host machine.

Now referring to FIGS. 1 and 2, when guest bridge 120 is located at host machine 102, guest bridge 120 may receive location information from hypervisor 106 specifying that a location of virtual network interface 222 is Mac Address 1 (MAC address assigned to physical network interface 204) and a location of virtual network interface 224 is Mac Address 2 (MAC address assigned to physical network interface 206). In contrast, when guest bridge 120 is located at host machine 152, guest bridge 120 may receive location information from hypervisor 156 specifying that a location of virtual network interface 222 is Mac Address 4 (MAC address assigned to physical network interface 256) and a location of virtual network interface 224 Mac Address 3 (MAC address assigned to physical network interface 254).

III. Update Forwarding Tables

Guest bridge 120 may update the set of forwarding tables based on the notification that guest bridge 120 has migrated so that the set of forwarding tables has correct and up-to-date information. The updated forwarding table may include a set of mappings from a network address to at least one virtual network interface of the set of virtual network interfaces, where the updated set of mappings maintained by guest bridge 120 in the source host machine is different from the initial set of mappings maintained by guest bridge 120 in the target host machine. Guest bridge 120 may update set of forwarding tables 232 by, for example, updating the networking addresses and/or interfaces in set of forwarding tables 232.

A. Check for Interface Crossing

Responsive to the notification that guest bridge 120 has migrated to host machine 152, guest bridge 120 may determine whether information in set of forwarding tables 232 is still accurate. In an embodiment, guest bridge 120 determines whether to update set of forwarding tables 232, where updating the set of forwarding tables 232 modifies entries (e.g., adding or deleting entries) in set of forwarding tables 232.

Figure 4:
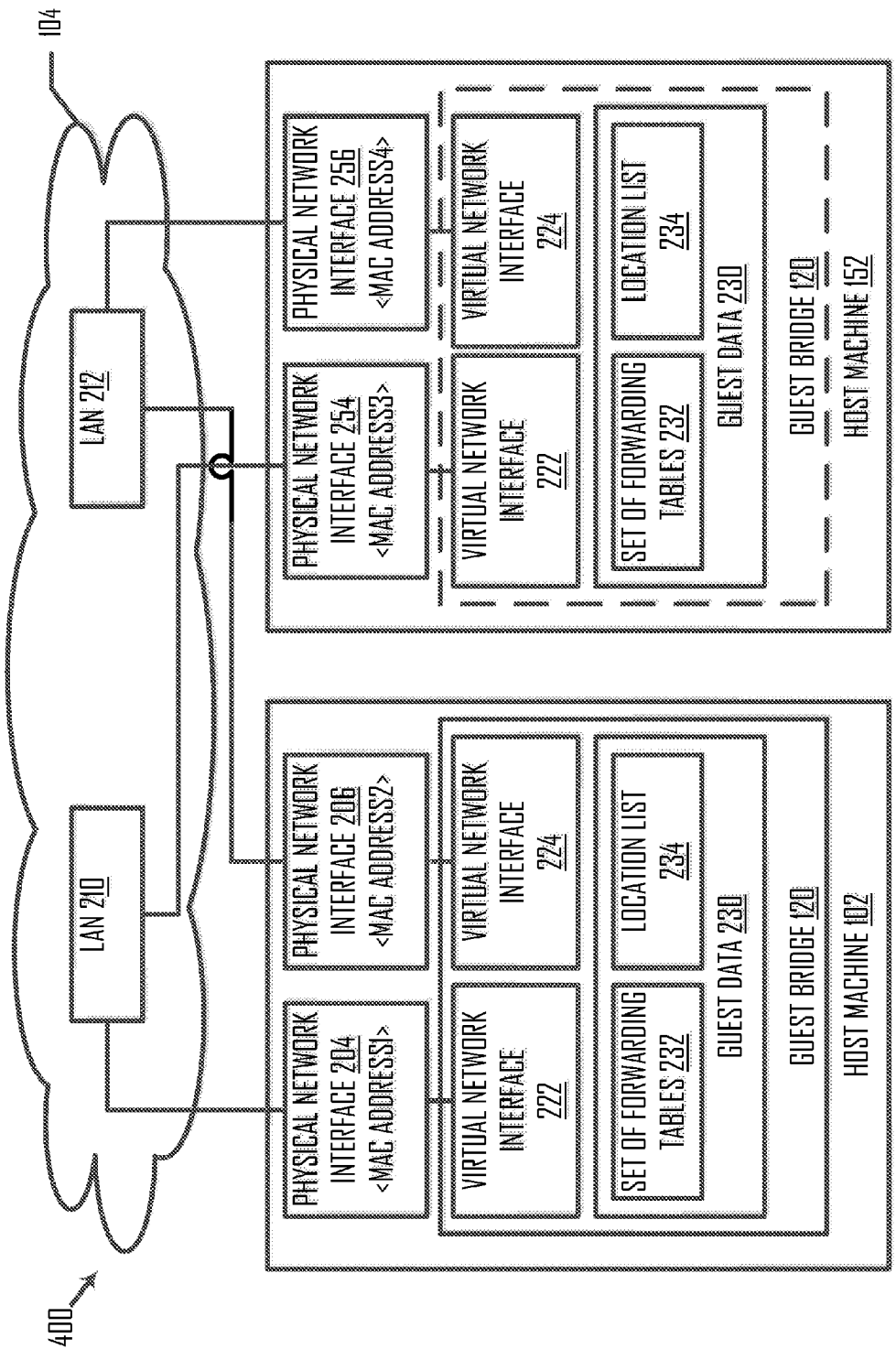
FIG. 4 is a block diagram illustrating a system after migration of the guest bridge to a target host machine, according to an embodiment.

FIG. 4 is a block diagram illustrating a system after migration of the guest bridge to a target host machine without interface crossing, according to an embodiment. In the example illustrated in FIG. 4, when guest bridge 120 is located at host machine 102, virtual network interface 222 of guest bridge 120 is coupled to local area network 210 via physical network interface 204 and virtual network interface 224 of guest bridge 120 is coupled to local area network 212 via physical network interface 206. When guest bridge 120 migrates from host machine 102 to host machine 152, virtual network interface 222 of guest bridge 120 is still coupled to local area network 210 (via physical network interface 254) and virtual network interface 224 of guest bridge 120 is still coupled to local area network 212 (via physical network interface 256). Accordingly, entries 302, 304, and 306 in this example are still accurate because packets may continue to be forwarded to the interface indicated in set of forwarding tables 232.

Guest bridge 120 may detect whether a virtual network interface of guest bridge 120 is "crossed" after migration and is coupled to a different network. If one or more virtual network interfaces of guest bridge 120 has been "crossed," guest bridge 120 may update set of forwarding tables 232 to reflect the current location of guest bridge 120. If no virtual network interfaces of guest bridge 120 have been "crossed," guest bridge 120 may update set of forwarding tables 232 by leaving the set of forwarding tables 232 as is.

In another example, guest bridge 120 may maintain a forwarding table for each virtual network interface for each location. When a virtual network interface of guest bridge 120 is coupled to the same network while located at the source and target host machines, guest bridge 120 may identify the mappings from the virtual network interface coupled to an interface in the source host machine and include the identified mappings in a forwarding table corresponding to the virtual network interface coupled to a different interface in the target host machine.

B. Delete Forwarding Table(s)

In an embodiment, responsive to the notification that guest bridge 120 has migrated to host machine 152, guest bridge 120 deletes the initial forwarding table(s) maintained by guest bridge 120 in host machine 102. Guest bridge 120 may update set of forwarding tables 232 by relearning the MAC address and interface associations, and store this information in set of forwarding tables 232.

In an example, when guest bridge 120 is located at host machine 152, physical network interface 204 may send a packet including a source MAC address of Mac Address 1, and guest bridge 120 may receive the packet at virtual network interface 224. Guest bridge 120 may insert an entry that associates Mac Address 1 with virtual network interface 224 into set of forwarding tables 232. As the packets are forwarded, the learning process of guest bridge 120 located at host machine 152 continues.

C. Deactivate Forwarding Table(s)

In an embodiment, responsive to the notification that guest bridge 120 has migrated to host machine 152, guest bridge 120 deactivates one or more entries in a forwarding table deactivates one or more forwarding tables maintained by guest bridge 120 in host machine 102. Guest bridge 120 may continue to store the deactivated entries and/or forwarding tables. In this way, if guest bridge 120 migrates back to host machine 102 at a later point in time, guest bridge 120 may reactivate these particular entries and/or forwarding tables to determine to which virtual network interfaces to forward packets. In an example, guest bridge 120 may determine whether a current location of a virtual network interface matches a previous location of the virtual network interface. If a match exists, guest bridge 120 may reactivate the entries and/or forwarding tables corresponding to this virtual network interface.

Guest bridge 120 may migrate through a chain of host machines before migrating back to, for example, host machine 102. Accordingly, guest bridge 120 may store forwarding information for each of these host machines and it may be unnecessary for guest bridge 120 to relearn the associations between MAC addresses and virtual network interfaces of guest bridge 120.

In an example, guest bridge 120 may update set of forwarding tables 232 by obtaining information regarding the current location of guest bridge 120. Guest bridge 120 may store its location information in location list 234. Location list 234 may be, for example, a database. Guest bridge 120 may determine whether a match exists between its current location and any of its previous locations and update the set of forwarding tables based on the determination. The location information and set of forwarding tables may be stored in a database using the location as a key. In an embodiment, when guest bridge 120 receives the notification that guest bridge 120 has been migrated, guest bridge 120 may query the location information to determine whether to reactivate any entries and/or tables in set of forwarding tables 232.

In an example, for each location of a virtual network interface of guest bridge 120, it maintains one or more forwarding tables. If guest bridge 120 determines that a match exists between any of its previous locations and current location, guest bridge 120 may reactivate and deactivate the appropriate forwarding table(s). For example, if guest bridge 120 maintains a first set of forwarding tables at host machine 102 and migrates to host machine 152, guest bridge 120 may deactivate the first set of forwarding tables and maintain a second set of forwarding tables at host machine 152. If guest bridge 120 migrates back to host machine 102, guest bridge 120 may deactivate the second set of forwarding tables and reactivate the first set of forwarding tables. The first and second sets of forwarding tables may be stored in an internal memory of guest bridge 120. In this way, when guest bridge 120 re-migrates back to a previous location, it may be unnecessary for guest bridge 120 to relearn the associations between MAC addresses and virtual network interfaces of guest bridge 120.

If guest bridge 120 has not executed at the current location before, guest bridge 120 may relearn the associations between MAC addresses and virtual network interfaces of guest bridge 120.

D. Remap Entries in Forwarding Table(s)

In an embodiment, guest bridge 120 maintains a forwarding table for each virtual network interface of guest bridge 120. Responsive to the notification that guest bridge 120 has migrated, for a given virtual network interface, guest bridge 120 may determine a location of the virtual network interface at the target host machine. The location may be a name of the local area network that is coupled to the virtual network interface. For example, in FIG. 4, when guest bridge 120 is located at host machine 152, guest bridge 120 may determine the current location of virtual network interface 224 to be "LAN 210" and the current location of virtual network interface 222 to be "LAN 212."

Guest bridge 120 may identify a current location of a given virtual network interface at the target host machine, identify a second virtual network interface at a previous location that matches the current location, and remap entries corresponding to the second virtual network interface to the given virtual network interface. In an embodiment, guest bridge 120 may search location list 234 based on the current locations of these virtual network interfaces. Guest bridge 120 may determine whether any current location of a virtual network interface matches a previous location of any virtual network interface. For example, location list 234 may include "LAN 210" and "LAN 212" because guest bridge 120 had migrated from host machine 102, where virtual network interface 222 was coupled to "LAN 210" and virtual network interface 224 was coupled to "LAN 212." Guest bridge 120 may identify "LAN 210" in the location list 234 and the mappings corresponding to this location in set of forwarding tables 232. Guest bridge 120 may then implement a remapping of the associations between the MAC address included in the received packets and the virtual network interface of guest bridge 120 such that the forwarding table corresponding to the virtual network interface at the current location is up-to-date.

Guest bridge 120 may determine that a previous location of virtual network interface 222 was "LAN 210," which is the current location of virtual network interface 224. Guest bridge 120 may then remap the mappings from virtual network interface 222 at the previous location to virtual network interface 224 at the current location. For example, referring to in FIG. 3, guest bridge 120 may identify entry 302 as including virtual network interface 222 and update the set of forwarding tables for virtual network interface 224 to include this mapping. As such, when guest bridge 120 is located at host machine 154 and receives a packet including a destination address of Mac Address 1, guest bridge 120 may forward the packet to virtual network interface 224.

Similarly, guest bridge 120 may determine that a previous location of virtual network interface 224 was "LAN 212," which is the current location of virtual network interface 222. Guest bridge 120 may then remap the mappings from virtual network interface 224 at the previous location to virtual network interface 222 at the current location. For example, referring to in FIG. 3, guest bridge 120 may identify entries 304 and 306 including virtual network interface 224 and update the set of forwarding tables for virtual network interface 222 to include these mappings. As such, when guest bridge 120 is located at host machine 154 and receives a packet including a destination address of Mac Address 2, guest bridge 120 may forward the packet to virtual network interface 222. Likewise, when guest bridge 120 is located at host machine 154 and receives a packet including a destination address of Mac Address 4, guest bridge 120 may forward the packet to virtual network interface 222. In this way, it may be unnecessary for guest bridge 120 to relearn from scratch the associations between MAC addresses and virtual network interfaces.

As discussed above and further emphasized here, FIGS. 1-4 are merely examples, which should not unduly limit the scope of the claims. For example, although system 100 is described herein with reference to two host machines, more than two host machines may be included in the system. Further, guest bridge 120 may migrate to more than two host machines and store forwarding tables and location list information for more than two host machines.

Moreover, although a host machine is illustrated as having two physical network interfaces, it should also be understood that a host machine may include more than two physical network interfaces. Additionally, although the guest bridge is illustrated as having two virtual network interfaces, it should also be understood that the guest bridge may include more than two virtual network interfaces.

As illustrated in the example of FIG. 1, guest bridge 120 may bridge two or more physical network interfaces. Additionally, guest bridge 120 may bridge two virtual network interfaces. In an example and referring to FIG. 1, two virtual machines may execute in host machine 102 (not shown) and may communicate with each other. The two virtual machines may each include a virtual network interface and be coupled via their respective virtual network interfaces to guest bridge 120. The two virtual machines may each execute workloads, and guest bridge 120 may, for example, run some analysis on the traffic passing between the two virtual machines. The two virtual machines that are bridged via guest bridge 120 may also execute on different host machines.

IV. Example Method

Figure 5:
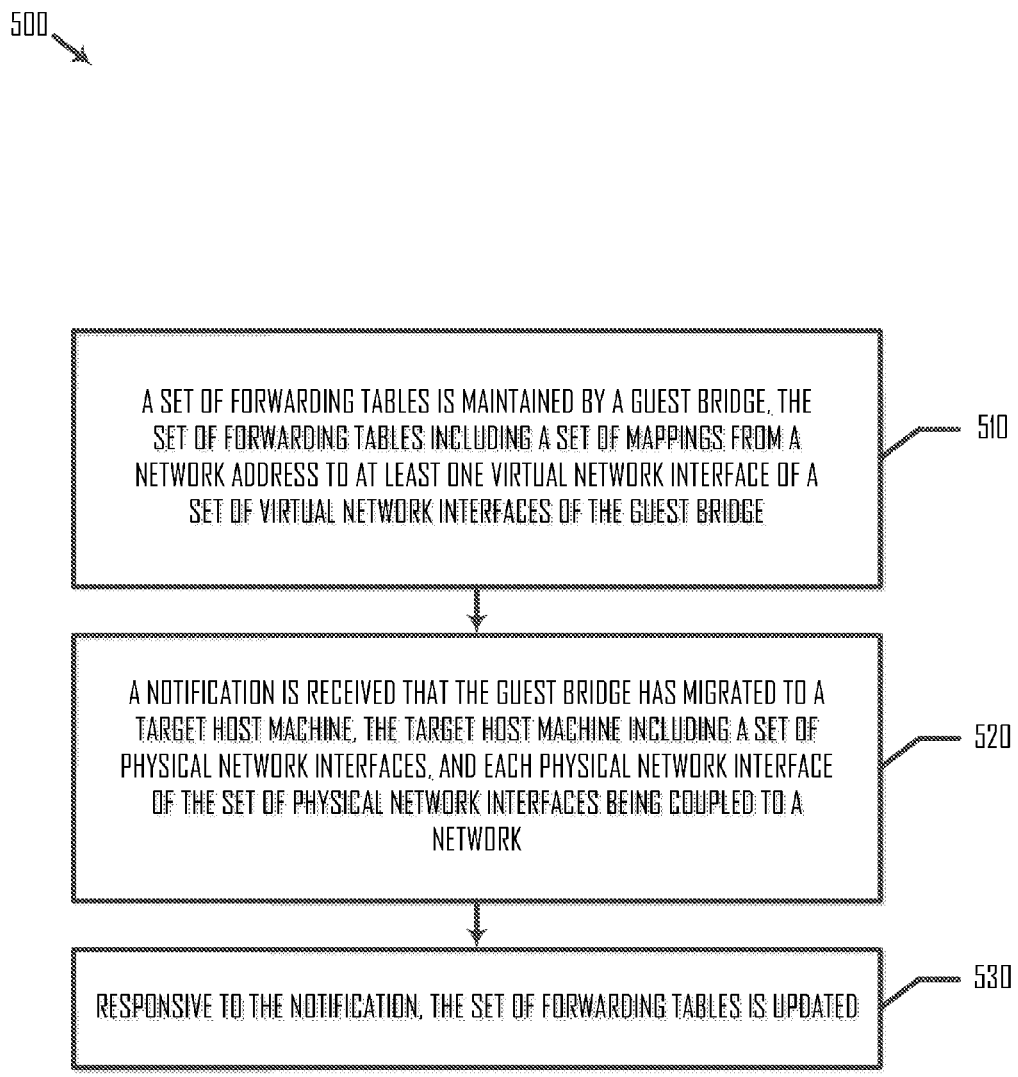
FIG. 5 is a flowchart illustrating a method of migrating a guest bridge to a target host machine, according to an embodiment.

FIG. 5 is a flowchart illustrating a method 500 of migrating a guest bridge to a target host machine, according to an embodiment. Method 500 is not meant to be limiting and may be used in other applications.

Method 500 includes steps 510-530. In a step 510, a set of forwarding tables is maintained by a guest bridge, the set of forwarding tables including a set of mappings from a network address to at least one virtual network interface of a set of virtual network interfaces of the guest bridge. In an example, guest bridge 120 maintains a set of forwarding tables including a set of mappings from a network address to at least one virtual network interface of a set of virtual network interfaces of the guest bridge.

In a step 520, a notification is received that the guest bridge has migrated to a target host machine, the target host machine including a set of physical network interfaces, and each physical network interface of the set of physical network interfaces being coupled to a network. In an example, guest bridge 120 receives a notification that the guest bridge has migrated to a target host machine, the target host machine including a set of physical network interfaces, and each physical network interface of the set of physical network interfaces being coupled to a network.

In a step 530, responsive to the notification, the set of forwarding tables is updated. In an example, responsive to the notification, guest bridge 120 updates the set of forwarding tables.

It is also understood that additional method steps may be performed before, during, or after steps 510-530 discussed above. It is also understood that one or more of the steps of method 500 described herein may be omitted, combined, or performed in a different sequence as desired.

V. Example Computing System

Figure 6:
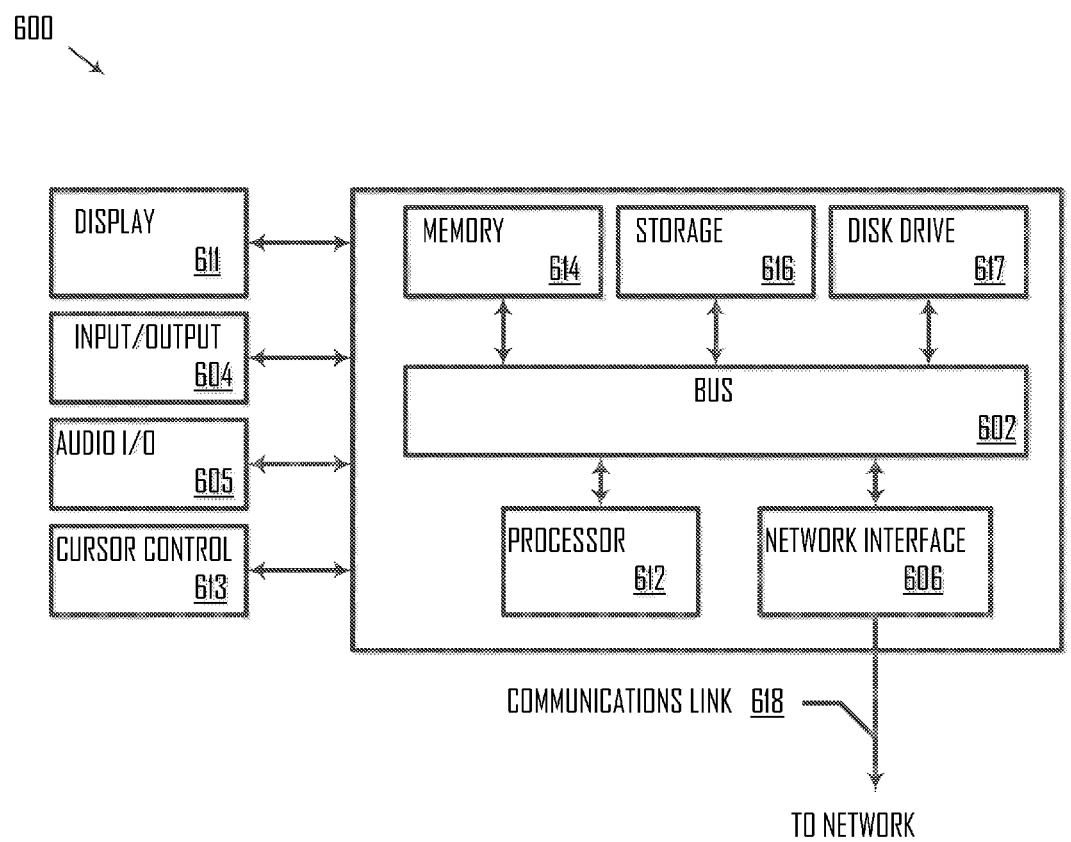
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, host machines 102 and 152 may include one or more processors. Host machines 102 and 152 may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a microcontroller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for migrating a guest bridge, the system comprising:
   a target host machine including a set of physical network interfaces, wherein each physical network interface of the set of physical network interfaces is coupled to a network; and
   a guest bridge executable on the target host machine, wherein the guest bridge receives a set of incoming packets and includes a set of virtual network interfaces, wherein each virtual network interface is coupled to a network via a physical network interface of the set of physical network interfaces,
   wherein the guest bridge maintains a set of forwarding tables including a set of mappings from a network address to at least one virtual network interface of the set of virtual network interfaces, and forwards based on the set of forwarding tables the set of incoming packets to at least one virtual network interface of the set of virtual network interfaces, and
   wherein the guest bridge receives a notification that the guest bridge has migrated from a source host machine to the target host machine and updates the set of forwarding tables based on the notification, wherein the guest bridge is executable on the source host machine, and
   wherein when the guest bridge is located at the target host machine, the guest bridge maintains a first forwarding table of the set of forwarding tables, and when the guest bridge is located at the source host machine, the guest bridge maintains a second forwarding table of the set of forwarding tables, and the second forwarding table includes a second set of mappings from a network address to at least one virtual network interface of the set of virtual network interfaces.

2. The system of claim 1, wherein the network address is a media access control (MAC) address.

3. The system of claim 1, wherein the guest bridge determines whether a location of a given virtual network interface at a current location matches a location of the given virtual network interface at a previous location, and updates the set of forwarding tables based on the determination.

4. The system of claim 1, further including:
   a source host machine including a second set of physical network interfaces, wherein each physical network interface of the second set of physical network interfaces is coupled to a network, and one or more virtual network interfaces of the set of virtual network interfaces is coupled to a network via a physical network interface of the second set of physical network interfaces.

5. The system of claim 4, wherein the guest bridge migrates from the source host machine to the target host machine, and responsive to the notification the guest bridge deletes the second forwarding table.

6. The system of claim 4, wherein the guest bridge migrates from the source host machine to the target host machine, and responsive to the notification the guest bridge deactivates the second forwarding table.

7. The system of claim 6, wherein responsive to the notification, the guest bridge determines whether a current location of a given virtual network interface of the guest bridge matches a previous location of the given virtual network interface of the guest bridge, and wherein when the current location matches the previous location, the guest bridge reactivates one or more entries in a forwarding table corresponding to the current location.

8. The system of claim 7, wherein the current location is a MAC address of a physical network interface that is coupled to the given virtual network interface of the guest bridge at the target host machine, and the previous location is a MAC address of a physical network interface that is coupled to the given virtual network interface of the guest bridge at the source host machine.

9. The system of claim 7, wherein the current location is a name of a network that is coupled to the virtual network interface of the guest bridge at the target host machine, and the previous location is a name of a network that is coupled to the given virtual network interface of the guest bridge at the source host machine.

10. The system of claim 3, wherein the guest bridge identifies a current location of a given virtual network interface at the target host machine, identifies a second virtual network interface at a previous location that matches the current location, and remaps entries of one or more forwarding tables of the set of forwarding tables corresponding to the second virtual network interface to the given virtual network interface.

11. A method of migrating a guest bridge, the method comprising:
  maintaining at a guest bridge a set of forwarding tables including a set of mappings from a network address to at least one virtual network interface of a set of virtual network interfaces of the guest bridge;
  receiving at the guest bridge a notification that the guest bridge has migrated from a source host machine to a target host machine, the target host machine including a set of physical network interfaces, and each physical network interface of the set of physical network interfaces being coupled to a network; and
  responsive to the notification, updating the set of forwarding tables,
  wherein the guest bridge is executable on the source host machine, and wherein when the guest bridge is located at the target host machine, the guest bridge maintains a first forwarding table of the set of forwarding tables, and when the guest bridge is located at the source host machine, the guest bridge maintains a second forwarding table of the set of forwarding tables, and the second forwarding table includes a second set of mappings from a network address to at least one virtual network interface of the set of virtual network interfaces.

12. The method of claim 11, wherein the network address is a media access control (MAC) address.

13. The method of claim 11, wherein the guest bridge determines whether a location of a given virtual network interface at a current location matches a location of the given virtual network interface at a previous location, and updates the set of forwarding tables based on the determination.

14. The method of claim 11, wherein the updating includes deleting the second forwarding table.

15. The method of claim 11, wherein the updating includes deactivating the second forwarding table.

16. The method of claim 15, further including:
  responsive to the notification, determining whether a current location of a given virtual network interface matches a previous location of the given virtual network interface; and
  when the current location matches the previous location, reactivating one or more entries in a forwarding table corresponding to the current location.

17. The method of claim 11, further including:
  identifying a current location of a given virtual network interface at the target host machine;
  identifying a second virtual network interface at a previous location that matches the current location; and
  remapping entries of one or more forwarding tables of the set of forwarding tables corresponding to the second virtual network interface to the given virtual network interface.

18. A non-transitory machine-readable medium comprising a plurality of machine-readable instructions that when executed by one or more processors is adapted to cause the one or more processors to perform a method comprising:
  maintaining at a guest bridge a set of forwarding tables including a set of mappings from a network address to at least one virtual network interface of a set of virtual network interfaces;
  receiving at the guest bridge a notification that the guest bridge has migrated from a source host machine to a target host machine, the target host machine including a set of physical network interfaces, and each physical network interface of the set of physical network interfaces being coupled to a network; and
  responsive to the notification, updating the set of forwarding tables, wherein the guest bridge is executable on the source host machine, and
  wherein when the guest bridge is located at the target host machine, the guest bridge maintains a first forwarding table of the set of forwarding tables, and when the guest bridge is located at the source host machine, the guest bridge maintains a second forwarding table of the set of forwarding tables, and the second forwarding table includes a second set of mappings from a network address to at least one virtual network interface of the set of virtual network interfaces.

19. The non-transitory machine-readable medium of claim 18, wherein the network address is a media access control (MAC) address.

20. The method of claim 11, wherein the first forwarding table is stored at the target host machine and includes a mapping from a first network address to a first virtual network interface of the set of virtual network interfaces, and the second forwarding table is stored at the source host machine and includes a mapping from the first network address to a second virtual network interface of the second set of virtual network interfaces.

* * * * *